(12) United States Patent
Schaefer et al.

(10) Patent No.: US 12,532,900 B2
(45) Date of Patent: Jan. 27, 2026

(54) FEED ADDITIVES OF FAT-SOLUBLE VITAMINS

(71) Applicant: DSM IP ASSETS B.V., Heerlen (NL)

(72) Inventors: Christian Schaefer, Kaiseraugst (CH); Roland Schex, Kaiseraugst (CH); Christos Tsekou, Kaiseraugst (CH); Thomas Zwick, Kaiseraugst (CH)

(73) Assignee: DSM IP ASSETS B.V., Maastricht (NL)

( * ) Notice: Subject to any disclaimer, the term of this patent is extended or adjusted under 35 U.S.C. 154(b) by 732 days.

(21) Appl. No.: 17/766,910

(22) PCT Filed: Oct. 12, 2020

(86) PCT No.: PCT/EP2020/078658
§ 371 (c)(1),
(2) Date: Apr. 6, 2022

(87) PCT Pub. No.: WO2021/069752
PCT Pub. Date: Apr. 15, 2021

(65) Prior Publication Data
US 2024/0108032 A1   Apr. 4, 2024

(30) Foreign Application Priority Data

Oct. 11, 2019 (EP) .................... 19202638

(51) Int. Cl.
*A23K 20/174* (2016.01)
*A23K 20/111* (2016.01)
*A23K 20/121* (2016.01)
*A23K 20/163* (2016.01)
*A23K 40/30* (2016.01)

(52) U.S. Cl.
CPC .......... *A23K 20/174* (2016.05); *A23K 20/111* (2016.05); *A23K 20/121* (2016.05); *A23K 20/163* (2016.05); *A23K 40/30* (2016.05)

(58) Field of Classification Search
CPC .... A23K 20/163; A23K 20/174; A23K 20/21; A23K 40/30
See application file for complete search history.

(56) References Cited

U.S. PATENT DOCUMENTS

| | | | |
|---|---|---|---|
| 2004/0209963 A1 | 10/2004 | Schaffner | |
| 2006/0115534 A1 | 6/2006 | Schaffner | |
| 2008/0193539 A1 | 8/2008 | Voelker | |
| 2018/0343909 A1 | 12/2018 | Schlegel et al. | |
| 2019/0075831 A1 | 3/2019 | Acharya et al. | |

FOREIGN PATENT DOCUMENTS

| | | | |
|---|---|---|---|
| CN | 101291598 | 10/2008 | |
| CN | 101312655 | 11/2008 | |
| CN | 101888788 | 11/2010 | |
| CN | 101888791 | 11/2010 | |
| CN | 108366605 | 8/2018 | |
| CN | 109517080 | 3/2019 | |
| EP | 2210593 | 7/2010 | |
| JP | H02693 | 1/1990 | |
| JP | H10-508243 | 8/1998 | |
| JP | 2004-529206 | 9/2004 | |
| JP | 2005-519894 | 7/2005 | |
| JP | 2006-517099 | 7/2006 | |
| JP | 2007-520603 | 7/2007 | |
| JP | 2019-502658 | 1/2019 | |
| WO | 2008/080152 | 7/2008 | |
| WO | WO-2017097974 A1 * | 6/2017 | ............ A23L 29/10 |
| WO | 2019/185888 | 10/2019 | |
| WO | 2019/185894 | 10/2019 | |
| WO | 2019/185898 | 10/2019 | |
| WO | 2019/185900 | 10/2019 | |
| WO | 2019/185904 | 10/2019 | |
| WO | 2019/185938 | 10/2019 | |
| WO | 2019/185940 | 10/2019 | |
| WO | 2019/185942 | 10/2019 | |
| WO | 2020/093919 | 5/2020 | |
| WO | 2020/093960 | 5/2020 | |
| WO | 2020/093962 | 5/2020 | |

OTHER PUBLICATIONS

International Search Report for PCT/EP2020/078658, mailed Jan. 11, 2021, 4 pages.
Written Opinion of the ISA for PCT/EP2020/078658, mailed Jan. 11, 2021, 6 pages.
Toledo et al., "CALCIUM 1-6,9 LI GNOSU LFONATE (40-65) Chemical and Technical Assessment", Apr. 19, 2011, pp. 1-8, XP055666905.
Notice of Reasons for Rejection, JP Application No. P2022-518982, Apr. 16, 2024.

\* cited by examiner

*Primary Examiner* — Jenna A Watts
(74) *Attorney, Agent, or Firm* — NIXON & VANDERHYE P.C.

(57) ABSTRACT

The present invention is directed to a feed additive comprising at least a fat-soluble vitamin and a process for its manufacture. Further objects of the present invention are feed comprising such feed additive, as well as methods for supplementation and corresponding uses of such feed additives and feed.

8 Claims, No Drawings

FEED ADDITIVES OF FAT-SOLUBLE VITAMINS

This application is the U.S. national phase of International Application No. PCT/EP2020/078658 filed Oct. 12, 2020 which designated the U.S. and claims priority to EP Patent Application No. 19202638.3 filed Oct. 11, 2019, the entire contents of each of which are hereby incorporated by reference.

SUMMARY OF THE INVENTION

The present invention is directed to a feed additive comprising
a) at least a fat-soluble vitamin in an amount in the range of from 1 to 40 weight-%;
b) at least a lignosulfonate in an amount in the range of from 5 to 55 weight-%; and
c) at least a compound selected from hexose-dimers, modified hexose-dimers, hexose-oligomers, modified hexose-oligomers, hexose-polymers, modified hexose-polymers, and any mixture thereof in an amount of at least 10 weight-%;
wherein the lignosulfonate and the compound c) form a matrix in which the fat-soluble vitamin is encapsulated;
wherein the feed additive is essentially free of ethoxyquin (=6-ethoxy-2,2,4-trimethyl-1,2-dihydroquinoline) and
wherein the feed additive is essentially free of butylated hydroxytoluene; all amounts based on the total weight of the feed additive.

The present invention is also directed to a process for the manufacture of such feed additive. Further objects of the present invention are feed comprising such feed additive, as well as methods for supplementation and corresponding uses of such feed additives and feed.

BACKGROUND OF THE INVENTION

Fat-soluble vitamins are important ingredients for feed of animals. They are, however, sensitive to oxidation and not water-soluble. Though there already exist a variety of water-dispersible formulations comprising fat-soluble vitamins, there is still a need of improving their stability.

OBJECT OF THE INVENTION

Thus, there is a need to provide a stable feed additive comprising at least one fat-soluble vitamin.

Furthermore, there is a need to provide feed additives with a certain color so that feed comprising them has an appealing color.

Another object of the present invention is to provide a feed additive that is animal-free, i.e. no compounds from animal sources such as e.g. gelatin are used.

Besides, the loss of the fat-soluble vitamin during manufacture of the feed additive (so called "process loss") should be preferably ≤7% of the initial amount, more preferably ≤5% of the initial amount, most preferably ≤3% of the initial amount.

DETAILED DESCRIPTION

This need is fulfilled by the present invention, which is directed to a feed additive comprising
a) at least a fat-soluble vitamin in an amount in the range of from 1 to 40 weight-%;
b) at least a lignosulfonate in an amount in the range of from 5 to 55 weight-%; and
c) at least a compound selected from hexose-dimers, modified hexose-dimers, hexose-oligomers, modified hexose-oligomers, hexose-polymers, modified hexose-polymers, and any mixture thereof in an amount of at least 10 weight-%;
wherein the lignosulfonate(s) b) and the compound(s) c) form a matrix in which the fat-soluble vitamin is encapsulated;
wherein the feed additive is essentially free of ethoxyquin and
wherein the feed additive is essentially free of butylated hydroxytoluene,
wherein all amounts are based on the total weight of the feed additive.

The present invention is also directed to a process for the manufacture of such feed additive. Further objects of the present invention are feed comprising such feed additive, as well as methods for supplementation and corresponding uses of such feed additives and feed.

Details are given below.

Advantageously, the feed additives of the present invention do not comprise beeswax which is in discussion because of increasing levels of pesticide residues.

Preferably the lignosulfonate(s) and the compound(s) c) form a dense and glassy matrix as mixture of compounds of varying molecular size and featuring different functional groups.

"encapsulated" means that the fat-soluble vitamin is embedded in the matrix of lignosulfonate(s) b) and the compound c) and thereby protected against oxidation and degradation. The precursor of the feed additive, i.e. the dispersion obtained after having performed step iv) of the process for the manufacture of the feed additive according to the present invention, forms an oil-in-water type dispersion whereby the fat-soluble vitamin is the oil being located in the internal phase and the lignosulfonate(s) act as emulsifier. The compound c) is the filler and additional emulsifier in the matrix contributing to its stability. After "powder catching" of the dispersion the matrix comprising the fat-soluble vitamin is coated by the absorbent. "Coated" in the context of the present invention means that the absorbent surrounds the matrix.

The single compounds of the feed additive according to the present invention and their amounts may be determined as follows:

Compound a): Fat-Soluble Vitamin(s)

The fat-soluble vitamin can e.g. be extracted and analyzed by HPLC-DAD (High Performance Liquid Chromatography Diode Array Detection) or HPLC-FL (High Performance Liquid Chromatography-Fluorescence Detection) in analogy to the following published method:

W. Schüp, J. Schierle, Carotenoids, Volume 1A: Isolation and Analysis; Editors: G. Britton, S. Liaaen-Jensen, H. Pfander; Birkhauser Verlag Basel (CH), 1995.

Compound b): Lignosulfonate(s)

The lignosulfonate(s) can be spectrophotometrically determined in formulations e.g. according to a procedure disclosed by G. Jayne and E. Pohl in Das Papier, 1967, 21, Vol. 10A, pages 645-653 ("Nachweis der Ligninsulfonsäure in grosser Verdünnung (Abwässer von Sulfitzellstoff-Fabriken)").

Compound c) Modified hexose-polymers such as e.g. OSA starches can be qualitatively identified using wet chemistry methods such as e.g. described in the monograph "Modified Starches" (FAO JECFA Monograph 16). The quantification of the OSA-starches can be performed by polarimetry (see e.g. Gorden A. Mitchel, Methods of Starch Analysis, 1990, 42, pages 131-134).

Mixtures of hexoses, hexose-dimers, hexose-oligomers and/or hexose-polymers; i.e. e.g. starch hydrolysates can be analyzed by size-exclusion chromatography; see e.g. White D R Jr, Hudson P, Adamson J T in Journal of Chromatography A 2003, 997(1-2), pages 79-85 ("Dextrin characterization by high-performance anion-exchange chromatography—pulsed amperometric detection and size-exclusion chromatography—multi-angle light scattering—refractive index detection.").

Hexoses and hexose-dimers; i.e. e.g. sugars such as sucrose, can be analyzed by HPLC (High Performance Liquid Chromatography) with RI (Refractive Index)-detection or pulsed amperometric detection; see e.g. Diana Duarte-Delgado, Carlos-Eduardo Narvbez-Cuenca, Luz-Patricia Restrepo-Sánchez, Ajjamada Kushalappa, Teresa Mosquera-Vásquez, Journal of Chromatography B 2015, Volume 975, pages 18-23 ("Development and validation of a liquid chromatographic method to quantify sucrose, glucose, and fructose in tubers of Solanum tuberosum Group Phureja").

Antioxidant(s)

Antioxidants can be analyzed by HPLC-DAD/FL (High Performance Liquid Chromatography—Diode Array Detection/Fluorescence Detection) as e.g. disclosed by Paula Becker Pertuzatti, Marla Sganzerla, Andressa Carolina Jacques, Milene Teixeira Barcia, Rui Carlos Zambiazi, in LWT—Food Science and Technology 2015, Volume 64, Issue 1, pages 259-263 ("Carotenoids, tocopherols and ascorbic acid content in yellow passion fruit (*Passiflora edulis*) grown under different cultivation systems").

Absorbent(s)

The coating with the absorbent can be qualitatively characterized using microscopic techniques coupled with spectroscopic techniques such as FTIR (Fourier Transformation Infrared) for identification of starches and X-ray fluorescence for silicium dioxide; see e.g. P. V. Kowsik, N. Mazumder, Microsc. Res. Tech. 2018, 81, pages 1533-1540 ("Structural and chemical characterization of rice and potato starch granules using microscopy and spectroscopy.") and M. Mutsuga, K. Sato, Y. Hirahara, Y. Kawamura, Food Addit. Contam. Part A Chem. Anal. Control Expo. Risk Assess. 2011, 28(4), pages 423-427 ("Analytical methods for $SiO_2$ and other inorganic oxides in titanium dioxide or certain silicates for food additive specifications"). For the determination of the other absorbents corresponding analytical methods are known to the person skilled in the art.

Details of the single compounds and their amounts in the feed additive according to the present invention are given below.

Compound a): Fat-Soluble Vitamins

The term "fat-soluble vitamins" comprises for the purpose of the present invention in particular vitamins A, D, E and/or K, the corresponding provitamins and vitamin derivatives such as esters, especially alkyl esters, with an action resembling that of vitamin A, D, E or K, as well as any mixture thereof. Coenzyme Q10 is also included.

"Vitamin D" means either Vitamin $D_3$ (cholecalciferol) or Vitamin $D_2$ (ergocalciferol) or both.

"Vitamin D derivative" means any derivative of Vitamin D as for example 25-hydroxy vitamin $D_3$ (so-called "HyD"), 1,25-dihydroxy vitamin $D_3$ or 24,25-dihydroxy vitamin $D_3$.

Vitamin K may be vitamin $K_1$ and/or vitamin $K_2$ and/or Vitamin $K_3$, especially vitamin $K_3$.

Especially preferred examples of fat-soluble vitamins are vitamin A, vitamin A acetate, vitamin A propionate, vitamin A palmitate, D-α-tocopherol, DL-α-tocopherol, D-α-tocopheryl acetate, DL-α-tocopheryl acetate, D-α-tocopheryl succinate, DL-α-tocopheryl succinate, vitamin $D_3$ and 25-hydroxy-vitamin D, as well as any mixture thereof. Most preferred are vitamin A acetate, vitamin $D_3$ and any mixture thereof.

As regards the amount of fat-soluble vitamin in the feed additive of the present invention, the amount of the free form of the fat-soluble vitamin is calculated directly, but the amount of a derivative of the fat-soluble vitamin is calculated in terms of the free form of the fat-soluble vitamin.

The amount of the fat-soluble vitamin is chosen in such a way so that its final amount in the feed additive is preferably in the range of from 1.0 to 40 weight-%, more preferably its final amount is in the range of from 5.0 to 35 weight-%, even more preferably its final amount is in the range of from 10 to 30 weight-%, most preferably its final amount is in the range of from 15 to 25 weight-%, based on the total weight of the dry matter of the feed additive comprising an absorbent. These preferences also apply to the preferred fat-soluble vitamins as given above.

Compound b): Lignosulfonate(s)

The lignosulfonates present in the feed additives according to the present invention are especially industrially produced products which contain lignosulfonates having the widest variety of cations. Sodium, calcium, magnesium and ammonium lignosulfonate are especially preferred. A feed additive according to the present invention can contain a single lignosulfonate or a mixture of several lignosulfonates as ingredient b). Furthermore, the lignosulfonate present in the feed additives according to the present invention can be part of an industrially produced product which contains further components in addition to the lignosulfonates.

As is known, the biopolymer lignin occurs together with cellulose in plants, especially in wood. Wood, depending on the type, contains about 16 to 37 weight-% of lignin. Considered chemically, lignin consists of irregular polymers of methoxylated phenylpropane monomers (p-coumaryl alcohol, coniferyl alcohol, sinapyl alcohol etc.) having a molecular weight estimated to be at least 20 kD. In a first step in the production of cellulose the wood is decomposed, which is achieved in most cases by treatment with sulfite lyes at 125°–180° C. Thereby, the cellulose is liberated and the lignin is converted into a water-soluble derivative, lignosulfonate (also known as "sulfite lignin"). On a smaller scale, the decomposition of wood is also achieved by treating the wood with sodium hydroxide and disodium tetrasulfide (the "Kraft process"). The lignin obtained in this process is referred to as "Kraft lignin" or "sulfate lignin" and is not water-soluble at neutral pH. More recent processes for the production of cellulose use organic solvents e.g. alcohol, also mixed with water, for the decomposition of wood, and the thus-produced lignin is referred to as "organosolv lignin". This form of lignin is likewise not water-soluble. At present, primarily lignosulfonates and Kraft lignins are commercially available.

Frequently, after the decomposition of the wood, the cellulose is separated and the resulting lignosulfonate-containing solution is concentrated to about 50% solid content and sold in this form. Most producers also offer pulverous products which have been obtained by spray-drying the solutions, and these solid forms also contain various saccharides in considerable amounts in addition to lignin. Some producers manufacture lignin derivatives having a relatively high content of lignosulfonate(s) from the primary (crude)

lignosulfonates by enzymatic removal of the saccharides and, if necessary, by purification, for example by ultracentrifugation. The Kraft lignins, which are also offered, can be sulfonated in order to achieve water-solubility and the sulfonation products are suitable as lignosulfonates for use in the preparations in accordance with the invention. Commercial lignosulfonate products typically consist of about 40-90% lignosulfonate and smaller amounts of various saccharides, ash, carbohydrates, acetates, formates, resins etc., with the composition depending very much on the quality of the wood which is used.

Such water-soluble lignosulfonate products are also suitable for use in the feed additives in accordance with the invention. In general, not only the crude products having a relatively high content of saccharides and additional byproducts but also the aforementioned purified lignin derivatives can be used in the feed additives in accordance with the invention, provided that such lignin derivatives are water-soluble or at least water-dispersible.

Preferred examples of well-suited lignin derivatives are: sodium lignosulfonate, ammonium lignosulfonate, magnesium and calcium lignosulfonate as well as any of their mixtures. Sodium lignosulfonate and calcium lignosulfonate are especially preferred. Most preferred is calcium lignosulfonate.

Suppliers of lignosulfonates are: Borregaard Industries Limited, Norway; Burgo Group, Rayonier Advanced Materials, Wuhan Xinyingda Chemicals, Shenyang Xingzhenghe Chemical, Abelin Polymers, GREENAGROCHEM, Harbin Fecino Chemical, Karjala Pulp, Nippon Paper Industries, Pacific Dust Control, Sappi, The Dallas Group of America, Venki Chem and Xinyi Feihuang Chemical.

Especially suitable de-sugared calcium lignosulfonate is available from Borregaard Industries Limited, Norway under the tradenames Borrebright CY22P, Borresperse Na220 and Borrement CA120, whereby Borrebright CY22P is especially preferred. This is manufactured by cutting spruce timer into chips and feeding it into a digester together with cooking calcium bisulfite solution. During the cooking at high temperature (130-140° C.) the lignin in the wood is depolymerized and sulfonated, which makes water-soluble lignosulfonates. At the end of the cooking the sulfite liquor contains calcium lignosulfonate and sugars. The sulfite liquor (calcium lignosulfonate and sugars) is separated from the cellulose pulp by filtration. The sulfite lye is concentrated to about 53% in an evaporation plant. The concentrated liquor is fed into a spray dryer to produce lignosulfonate powder (inlet temperature in the range of from 200 to 250° C.).

The amount of the lignosulfonate(s) is chosen in such a way so that its final amount in the feed additive is preferably in the range of from 5 to 55 weight-%, more preferably its final amount is in the range of from 5 to 50 weight-%, even more preferably its final amount is in the range of from 5 to 45 weight-%, most preferably its final amount is in the range of from 10 to 40 weight-%, based on the total weight of the dry matter of the feed additive comprising an absorbent.

In a preferred embodiment of the present invention the weight ratio of the lignosulfonate(s) b) to the fat-soluble vitamin(s) a) is in the range of from 10:1 to 1:10, preferably in the range of from 7:1 to 1:7, more preferably in the range of from 5:1 to 1:5, even more preferably in the range of from 3:1 to 1:3, most preferably in the range of from 2:1 to 1:2.

In further preferred embodiments of the present invention the weight ratio of the compound c) to the lignosulfonate(s) b) is in the range of from 1:15 to 25:1 preferably in the range of from 1:10 to 20:1, more preferably in the range of from 1:7 to 15:1, even more preferably in the range of from 1:5 to 10:1, especially more preferably in the range of from 1:3 to 8:1, most preferably in the range of from 1:2 to 5:1.

Compound c)

The compound c) is selected from hexose-dimers, modified hexose-dimers, hexose oligomers, modified hexose oligomers, hexose-polymers, modified hexose-polymers and any mixture thereof. A hexose may also be present. That means that mixtures of hexoses and hexose-dimers are also encompassed. An example of a mixture of hexose and hexose-dimers is invert sugar (glucose+fructose+sucrose).

A hexose is a monosaccharide with six carbon atoms. Hexoses are classified by functional group, with aldohexoses having an aldehyde at position 1, and ketohexoses having a ketone at position 2.

Preferably the compound c) is selected from aldohexose-oligomers or aldohexose polymers or modified aldohexose polymers or any mixture thereof.

The hexose in the hexose-dimers may be one single hexose or two hexoses being distinct from each other. Examples of hexose-dimers are sucrose (glucose-fructose-dimer), lactose (glucose-galactose-dimer), maltose (glucose-dimer with a a-(1-4)-linkage), isomaltose (glucose-dimer with a a-(1-6)-linkage), trehalose (glucose-dimer with a a-(1-1)-linkage) and nigerose (glucose-dimer with a a-(1-3)-linkage), as well as any mixture thereof. One preferred example of a hexose-dimer where the two hexoses are distinct from each other is sucrose, a glucose-fructose-dimer.

The hexose in the hexose-oligomers may be one single hexose or several hexoses being distinct from each other. Preferably the hexose is glucose. More preferred examples of hexose-oligomers are hydrolysed starch products such as glucose syrups, dried glucose syrups or dextrins. Such glucose syrups, dried glucose syrups and dextrins are classified according to their "dextrose equivalents" and may further contain hexoses, hexose-dimers and hexose polymers.

"Dextrose" is a synonym for "glucose". The term "dextrose equivalent" (DE) denotes the degree of hydrolysis and is a measure of the amount of reducing sugar calculated as D-glucose based on dry weight; the scale is based on native starch having a DE close to 0 and glucose having a DE of 100.

Maltodextrin is a dextrin with a DE in the range of from 3 to 20; hydrolysed starch products with a DE>20 are called "glucose syrups" or "dried glucose syrups"-depending on their water content. "Glucose syrups" or "dried glucose syrups" may be used in form of powders, micro-granulates or granulates. Glucose syrups consist in general of a mixture of glucose, maltose and oligo- and polysaccharides with varying amounts of these ingredients.

Commercially available hexose-oligomers that also contain hexoses and hexose-dimers are e.g. commercially available under the tradenames Glucidex 21 (from Roquette), Glucidex IT 47 (from Roquette), Dextrose Monohydrate ST (from Roquette), Sirodex 331 (from Tate & Lyle), Glucamyl F 452 (from Tate & Lyle) and Raftisweet I 50/75/35 (from Lebbe Sugar Specialties), whereby Glucidex 21 and Glucidex 47 are especially preferred.

The hexose in the hexose-polymers and modified hexose-polymers may be one single hexose or a mixture of many hexoses. Preferably one hexose or two hexoses being distinct from each other are present in the hexose-polymers or modified hexose-polymers of the present invention. More preferably the modified hexose-polymers are modified food starches such as starches modified with octenyl succinic acid (so-called "OSA-starches"), which are in fact a mixture of glucose, glucose-dimers, glucose-oligomers, glucose-polymers (=starch) and OSA-modified glucose-dimers, glucose-oligomers and glucose-polymers (=OSA-modified starch).

Further suitable modified hexose-polymers are the OSA-starches modified according to the processes as disclosed in WO 2020/093962, WO 2020/093919, WO 2020/093960 and CN-A 109 517 080.

An example of a hexose-polymer, especially an aldohexose polymer, is native starch, especially native corn starch. Further examples are starches from other botanical sources such as waxy corn, wheat, tapioca, pea and potato.

The most preferred compounds c) are starch hydrolysates, such as e.g. dried glucose syrups and dextrins, with a DE in the range of from 10 to 50, more preferably with a DE in the range of from 15 to 40, even more preferably with a DE in the range of from 15 to 30, most preferably with a DE in the range of from 15 to 25.

Commercially available examples of such starch hydrolysates are dried glucose syrups as e.g. Glucidex 21 and Glucidex IT47, and dextrins such as Yellow dextrin. Most preferred examples are also their mixtures with modified food starches, whereby a weight ratio of starch hydrolysate, especially dextrin such as e.g. Yellow dextrin, to modified food starch, especially OSA starch, ranging from 1:10 to 10:1, preferably ranging from 1:7 to 7:1, more preferably ranging from 1:6 to 6:1, even more preferably ranging from 1:1 to 1:6, most preferably of 1:1 to 1:5 is especially preferred. More details are given below.

Glucidex 21 is a dried glucose syrup with a DE ranging from 20 to 23 in the form of a fine powder with at least 50% of the particles being greater than 40 m and at most 10% of the particles being greater than 250 m. Glucidex 21 contains 3% glucose, 7% maltose and 90% oligo- and polysaccharides.

Glucidex IT 47 is a dried glucose syrup with a DE ranging from 43 to 47 in the form of micro-granulates with at least 95% of the particles being greater than 40 m and at most 5% of the particles being greater than 500 m. Glucidex IT 47 contains 5% glucose, 50% maltose and 45% oligo- and polysaccharides.

Further preferred compounds c) are starch hydrolysates that have a maximum amount of 10 weight % of reducing sugars, based on the total weight of the starch hydrolysate.

The amount of the compound c) is chosen in such a way so that its final amount in the feed additive is at least 10 weight-%, preferably its final amount is in the range of from 15 to 70 weight-%, more preferably its final amount is in the range of from 20 to 65 weight-%, most preferably its final amount is in the range of from 20 to 45 weight-%, based on the total weight of the dry matter of the feed additive.

In a preferred embodiment of the present invention, the compound c) is a mixture of at least 5 weight-% of a hexose oligomer such as e.g. dextrins and at least 10 weight-% of a modified hexose polymer such as e.g. modified food starch, both amounts based on the total weight of the feed additive.

In a further preferred embodiment of the present invention, the compound c) is a mixture of a hexose oligomer such as e.g. dextrins in an amount in the range of from 5 to 25 weight-% and a modified hexose polymer such as e.g. modified food starch in an amount in the range of from 10 to 45 weight-%, both amounts based on the total weight of the feed additive.

Dextrins

Dextrins are a group of low-molecular-weight carbohydrates produced by the hydrolysis of starch or glycogen. Dextrins are mixtures of polymers of D-glucose units linked by α-(1→4) or α-(1→6) glycosidic bonds.

Dextrins can e.g. be produced from starch using enzymes like amylases or by applying dry heat under acidic conditions ("pyrolysis" or "roasting"). Dextrins produced by heat are also known as «pyrodextrins». The starch hydrolyses during roasting under acidic conditions, and short-chained starch parts partially rebranch with α-(1,6) bonds to the degraded starch molecule. They have a low viscosity.

Preferably commercially available Yellow Dextrin from Roquette is used in the feed additives of the present invention.

"Modified Food Starch"

A modified food starch is a food starch that has been chemically modified by known methods to have a chemical structure which provides it with a hydrophilic and a lipophilic portion. Preferably the modified food starch has a long hydrocarbon chain as part of its structure (preferably C5-C18).

At least one modified food starch is preferably used to make a feed additive of this invention, but it is possible to use a mixture of two or more different modified food starches in one feed additive.

Starches are hydrophilic and therefore do not have emulsifying capacities. However, modified food starches are made from starches substituted by known chemical methods with hydrophobic moieties. For example, starch may be treated with cyclic dicarboxylic acid anhydrides such as succinic anhydrides, substituted with a hydrocarbon chain. A particularly preferred modified food starch has the following formula (I)

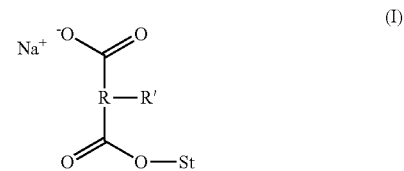

(I)

wherein St is a starch, R is an alkylene radical and R' is a hydrophobic group. Preferably R is a lower alkylene radical such as dimethylene or trimethylene. R' may be an alkyl or alkenyl group, preferably having 5 to 18 carbon atoms. A preferred compound of formula (I) is an "OSA-starch" (starch sodium octenyl succinate). The degree of substitution, i.e. the number of esterified hydroxyl groups to the number of free non-esterified hydroxyl groups usually varies in a range of from 0.1% to 10%, preferably in a range of from 0.5% to 4%, more preferably in a range of from 2% to 3%.

The term "OSA-starch" denotes any starch from any natural source that was treated with octenyl succinic anhydride (OSA). The degree of substitution, i.e. the number of hydroxyl groups esterified with OSA to the number of free non-esterified hydroxyl groups usually varies in a range of from 0.1% to 10%, preferably in a range of from 0.5% to 4%, more preferably in a range of from 2% to 3%. "Modified food starch" is a synonym often used for OSA-starches.

The natural source of the starch may be corn, waxy corn, wheat, tapioca, pea and potato or synthesized.

The term "OSA-starches" encompasses also such starches that are commercially available e.g. from Ingredion under the tradenames HiCap 100, Capsul (octenylbutanedioate amylodextrin), Capsul HS, Purity Gum 2000, Cleargum COA1, Cleargum C003, UNI-PURE, HYLON VII; from Ingredion and Roquette, respectively; from Cargill under the tradename C*EmCap or from Tate & Lyle.

In a preferred embodiment of the present invention a commercially available modified food starch such as Capsul and Capsul HS from Ingredion or Cleargum COA1 from Roquette, respectively, is used.

The terms "modified starches" and "OSA-starches" encompass further also modified starches/OSA-starches that were partly hydrolysed enzymatically, e.g. by glycosylases (EC 3.2; see http://www.chem.qmul.ac.uk/iubmb/enzyme/EC3.2/), as well as to modified starches/OSA-starches that were partly hydrolysed chemically by known methods (so-called acid degradation).

The enzymatic hydrolysis is conventionally carried out at a temperature of from about 5° C. to about <100° C., preferably at a temperature of from about 5° C. to about 70° C., more preferably at a temperature of from about 20° C. to about 55° C.

The glycosylases can be from fruit, animal origin, bacteria or fungi. The glycolase may have endo-activity and/or exo-activity. Therefore, enzyme preparations of endo- and exo-glycosylases or any of their mixtures may be used. Preferably the glycosylases have pectolytic and/or hemicelluloytic activity. Usually the glycosylases show also unknown side activities, but which are not critical for the manufacture of the desired product.

Examples of glycosylases are the commercially available enzyme preparations from the suppliers Novozymes, Genencor, AB-Enzymes, DSM Food Specialities, Amano, etc.

The glycosylase is added to provide a concentration of from about 0.01 to about 10 weight-%, preferably of from about 0.1 to about 1 weight-%, based on the dry weight of the modified starch/OSA-starch. In a preferred embodiment of the process of the invention, the enzyme is added at once. The enzymatic hydrolysis may also be carried out stepwise. For instance, the glycosylase or a mixture of glycosylases is added to the incubation batch in an amount of e.g. 1% whereupon, e.g. after 5 to 10 minutes (at a temperature of 35° C.) further glycosylase or a mixture of glycosylases which may by the same or different from the first added glycosylase or mixture of glycosylases is added, e.g. in an amount of 2% whereupon the incubation batch is hydrolysed at 35° C. for 10 minutes. Using this procedure, starting modified starches/OSA-starches having a degree of hydrolysis of approximately zero can be used.

The duration of hydrolysis may vary between about a few seconds and about 300 minutes. The exact duration of the enzymatic treatment may be determined in an empirical way with respect to the desired properties of the modified starch/OSA-starch, such as emulsifying stability, emulsifying capacity, droplet size of the emulsion, depending strongly on parameters like enzyme activities, or composition of the substrate. Alternatively, it may be determined by measuring the osmolality (W. Dzwokak and S. Ziajka, Journal of food science, 1999, 64 (3) 393-395).

The inactivation of the glycosylase is suitably achieved by heat denaturation, e.g. by heating of the incubation batch to about 80 to 85° C. for 5 to 30 minutes, especially for 5 to 10 minutes.

Compound d): Antioxidants

The regulatory approval to use ethoxyquin in feed is suspended in the European Union. Therefore, it is advantageous that the feed additive of the present invention is essentially free of ethoxyquin.

"essentially free of" in the context of the present invention means that the amount of ethoxyquin is ≤0.5 weight-%, preferably ≤0.2 weight-%, more preferably ≤0.1 weight-%, based on the total weight of the dry matter of the feed additive. Most preferably no ethoxyquin is added during the manufacture of the feed additive of the present invention. Thus, most preferably no ethoxyquin is present in the feed additive of the present invention.

Advantageously the feed additive of the present invention is also essentially free of butylated hydroxytoluene such as 2,6-di-tert-butyl-p-cresol (IUPAC name=2,6-di-tert-butyl-4-methylphenol).

"essentially free of" in the context of the present invention means that the amount of butylated hydroxytoluene is ≤0.5 weight-%, preferably ≤0.2 weight-%, more preferably ≤0.1 weight-%, based on the total weight of the dry matter of the feed additive. Most preferably no butylated hydroxytoluene is added during the manufacture of the feed additive of the present invention. Thus, most preferably no butylated hydroxytoluene is present in the feed additive of the present invention.

In a most preferred embodiment of the present invention neither ethoxyquin nor butylated hydroxytoluene are present in the feed additive of the present invention.

The feed additive may comprise an antioxidant or a mixture of antioxidants. Preferably a mixture of a fat-soluble antioxidant and a water-soluble antioxidant is used.

The total amount of the antioxidant is chosen in such a way so that its final amount in the feed additive is preferably in the range of from 0.05 to 15 weight-%, more preferably its final amount is in the range of from 0.1 to 10 weight-%, most preferably its final amount is in the range of from 0.5 to 8 weight-%, based on the total weight of the dry matter of the feed additive comprising an absorbent.

Examples of suitable fat-soluble antioxidants are tocopherols and analogues thereof such as e.g. compounds of formula (II)

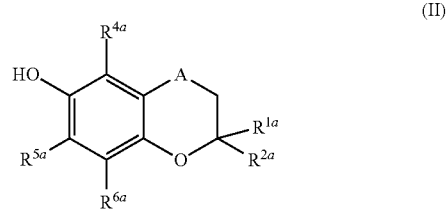

(II)

wherein $R^{1a}$ and $R^{2a}$ are independently from each other H or $C_{1-11}$-alkyl or $(CH_2)_n$—OH with n being an integer from 1 to 4, or $R^{1a}$ and $R^{2a}$ represent together a keto group, A is $CHR^{3a}$ or $C(=O)$, and wherein $R^{3a}$, $R^{4a}$ and $R^{6a}$ are independently from each other H or $C_{1-4}$-alkyl, and wherein $R^{5a}$ is H or OH or $C_{1-4}$-alkyl or $C_{1-4}$-alkoxy, as disclosed in WO 2019/185894.

Further suitable fat-soluble antioxidants are compounds of formula (II), wherein one of the two substituents $R^{1a}$ and $R^{2a}$ is $C_{12-21}$-alkyl and the other of the two substituents $R^{1a}$ and $R^{2a}$ is either hydrogen or $C_{1-5}$-alkyl or $(CH_2)_n$—OH with n being an integer from 1 to 5, and wherein A is $CH(R^{3a})$, and wherein $R^{3a}$, $R^{4a}$ and $R^{6a}$ are independently from each other H or $C_{1-4}$-alkyl, and wherein $R^{5a}$ is H or OH or $C_{1-4}$-alkyl or $C_{1-4}$-alkoxy, as disclosed in WO 2019/185938.

Compounds of formula (II), wherein A is $CH_2$, $R^{1a}$ is $C_{1-5}$-alkyl, $R^{2a}$ is either H or $C_{1-2}$-alkyl, $R^{5a}$ is either H or $C_{1-4}$-alkoxy or $C_{1-4}$-alkyl, and $R^{4a}$ and $R^{6a}$ are independently from each other either H or $C_{1-4}$-alkyl, with the preferences as disclosed in WO 2019/185900 are also suitable antioxidants in the feed additives of the present invention.

Preferred examples of the antioxidants of formula (II) as disclosed in WO 2019/185894 are the following compounds of formula (1)-(11) with "Me" being methyl:

(1)
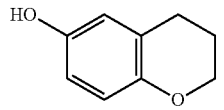

(2)
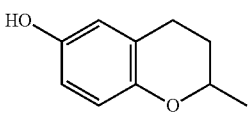

(3)
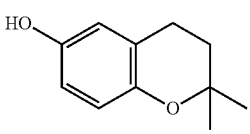

(4)
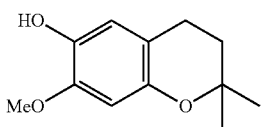

(5)
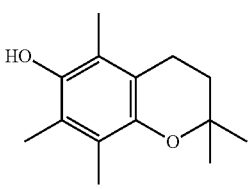

(6)
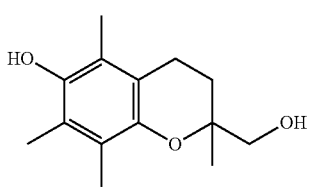

(7)
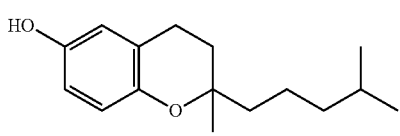

(8)
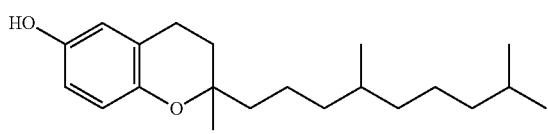

(9)
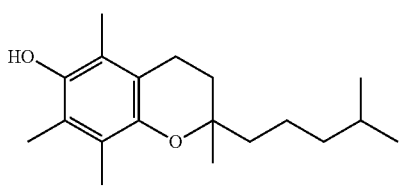

(10)
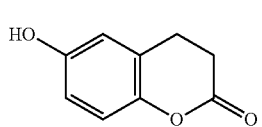

(11)
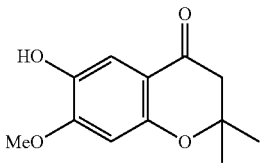

Further examples of suitable antioxidants that can be used in the feed additives of the present invention are compounds of formula (III) and (IV), (III)
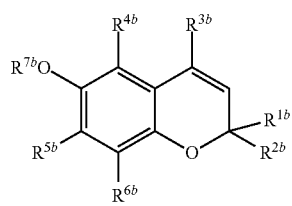

(IV)
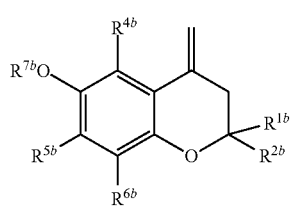

wherein $R^{1b}$ and $R^{2b}$ are independently from each other H or $C_{1-11}$-alkyl or $(CH_2)_n$—OH with n being an integer from 1 to 6 or $R^{1b}$ and $R^{2b}$ together represent a keto group, and wherein $R^{3b}$, $R^{4b}$, $R^{5b}$, and $R^{6b}$ are independently from each other H or $C_{1-6}$-alkyl or $C_{1-6}$-alkoxy, and $R^{7b}$ is H or $C_{1-6}$-alkyl, as disclosed in WO 2019/185898.

"alkyl" and "alkoxy" hereby encompass linear alkyl and branched alkyl, and linear alkoxy and branched alkoxy, respectively.

Preferred examples of compounds of formula (III) and (IV) are the following compounds (12)-(19):

(12)
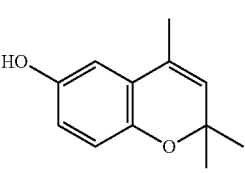

(13)
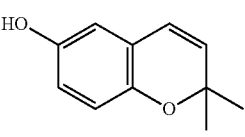

(14)
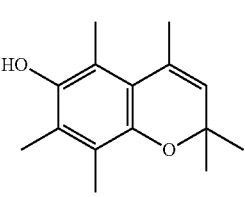

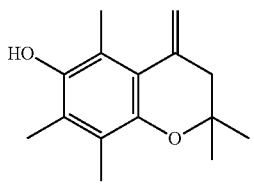
(15)

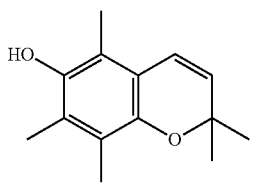
(16)

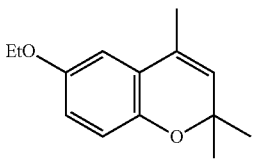
(17)

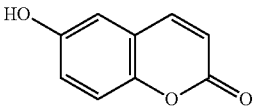
(18)

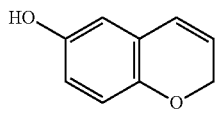
(19)

Further suitable antioxidants are compounds of formula (V), whereby $R^1$, $R^2$ and $R^3$ are independently from each other H or linear $C_{1-6}$-alkyl or branched $C_{3-8}$-alkyl, whereby preferably $R^1$ is H or methyl or ethyl or n-propyl or iso-propyl or tert-butyl and $R^2$ and $R^3$ are independently from each other H or methyl or ethyl, with the further preferences as disclosed in WO 2019/185940.

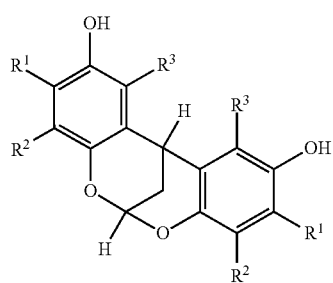
(V)

Also, the compounds of formula (VI) with n being 1 or 2, $R^{1b}$ and $R^{3b}$ being independently from each other H or $C_{1-5}$-alkyl, and $R^{2b}$ being either H or $C_{1-5}$-alkyl or $C_{1-5}$-alkyloxy, preferably with the proviso at least one of $R^{1b}$, $R^{2b}$ and $R^{3b}$ being H, as disclosed in WO 2019/185904 can be used as antioxidants in the feed additives of the present invention.

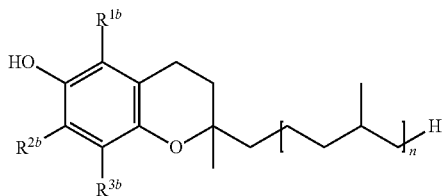
(VI)

Hereby the following compounds of formulae (VI-1) and (VI-2) are especially preferred:

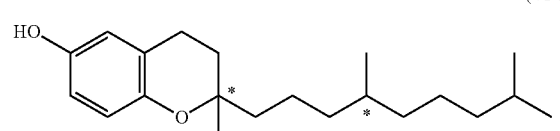
(VI-1)

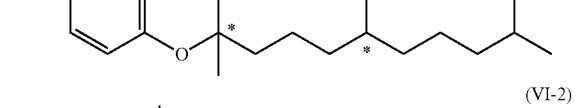
(VI-2)

The asterisks * mark each a chiral/stereogenic center, i.e. all possible isomers having any configuration at said centers are encompassed by the term "compound of formula (VI-1)" and "compound of formula (VI-2)", respectively.

Further suitable antioxidants are gallic acid derivatives such as the ones disclosed in WO 2008/080152, hydroxycinnamic acids such as e.g. ferulic acid (=3-(4-hydroxy-3-methoxyphenol)prop-2-enoic acid), hydroxycoumarines, hydroxybenzoic acids such as e.g. gallic acid (=3,4,5-trihydroxybenzoic acid) and syringic acid (=4-hydroxy-3,5-dimethoxy-benzoic acid), propyl gallate, rosmarinic acid and carnosic acid.

Also suitable fat-soluble antioxidants are compounds of the following formulae (VII) and (VIII) with $R^{1c}$, $R^{2c}$ and $R^{3c}$ being independently from each other H or $C_{1-4}$-alkyl as published in WO 2019/185942 and WO 2019/185888, respectively. Preferred examples thereof are tocotrienols and tocopherols of the formulae (20) to (27) as shown below.

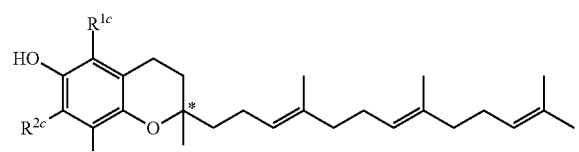
(VII)

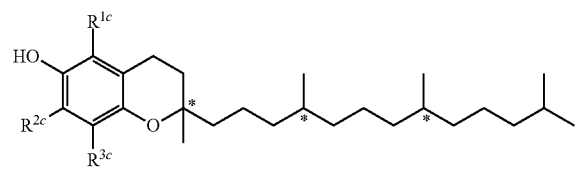
(VIII)

The asterisks * mark each a chiral/stereogenic center. The term "compound of formula (VII)/(VIII)" encompasses all possible isomers having any configuration at said centers.

Especially preferred examples of the compound of formula (VII) are the following compounds of formulae (20) (=alpha-tocotrienol), (21) (=beta-tocotrienol), (22) (=gamma-tocotrienol) and (23) (=delta-tocotrienol), whereby all possible diastereomers and enantiomers are included.

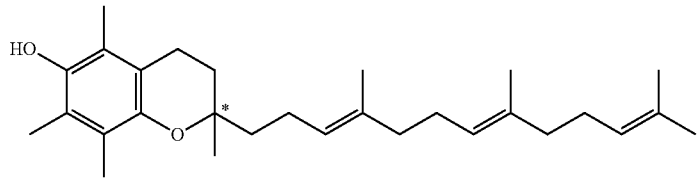

(20)

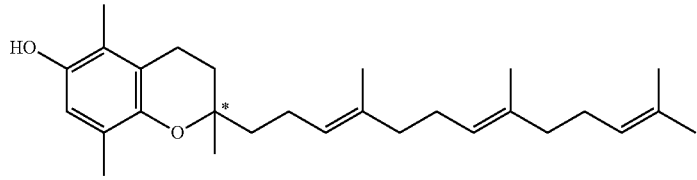

(21)

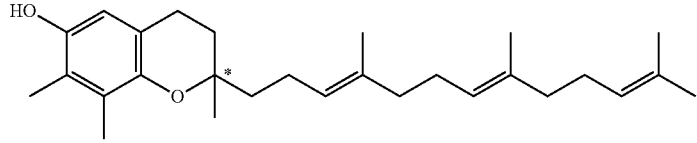

(22)

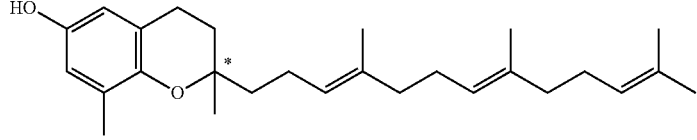

(23)

Especially preferred examples of the compound of formula (Viii) are the following compounds of formulae (20) (=alpha-tocopherol), (21) (=beta-tocopherol), (22) (=gamma-tocopherol) and (23) (=delta-tocopherol), whereby all possible diastereomers and enantiomers are included.

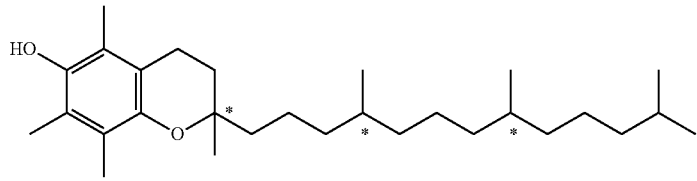

(24)

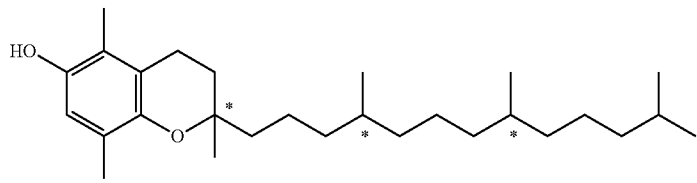

(25)

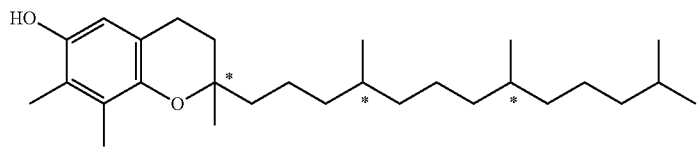

(26)

-continued

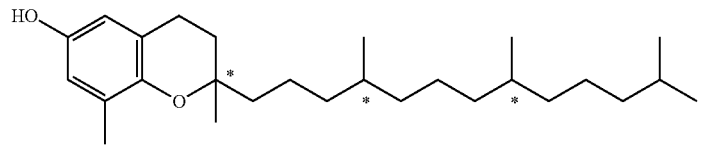

(27)

The asterisks * mark each a chiral/stereogenic center. The term "compound of formula (20)/(21)/(22)/(23)/(24)/(25)/(26)/(27)" encompasses all possible isomers having any configuration at said centers.

The most preferred fat-soluble antioxidant is a-tocopherol, especially DL-α-tocopherol.

In case the fat-soluble vitamin is vitamin E, the vitamin E may itself act as antioxidant, so that the amount of vitamin E is increased accordingly.

Water-Soluble Antioxidants

In general any water-soluble antioxidant being allowed in feed and known to the person skilled in the art may be used.

Preferred examples of water-soluble antioxidants are ascorbic acid and salts thereof, such as alkali and earth alkali salts of ascorbic acid and ascorbyl-2-phosphate salts as disclosed in EP-A 972 777. Especially preferred are alkali and earth alkali salts of ascorbic acid. The most preferred water-soluble antioxidant is sodium ascorbate.

Most Preferred Antioxidants in the Feed Additive According to the Present Invention Most preferred is the use of α-tocopherol as sole antioxidant in an amount ranging from 0.05 to 10 weight-%, preferably ranging from 0.1 to 7 weight-%, more preferably ranging from 0.5 to 5 weight-%, most preferably ranging from 1 to 3 weight-%, based on the total weight of the feed additive.

If a mixture of alpha-tocopherol and sodium ascorbate is used as antioxidant, the weight ratio of alpha-tocopherol to sodium ascorbate ranges preferably from 5:1 to 1:5, more preferably from 3:1 to 1:3, even more preferably from 2.5:1 to 1:2, most preferably from 2:1 to 1:1.5.

Feed Additives According to the Present Invention

The feed additive may be in liquid (=dispersion) or solid form.

The composition of a preferred solid feed additive according to the present invention is shown in the following Table 1, where the ingredients and their amounts are given. The amounts are given in weight-% and are based on the total weight of the feed ingredient comprising an absorbent. The amounts of all ingredients sum up to a total weight of 100%.

It is understood that each single preferred amount of one ingredient may be combined with each preferred single amount of any other ingredient.

A preferred feed additive comprising an absorbent is one, wherein the total amount of the compounds a) to d) is at least 90 weight-%, preferably at least 95 weight-%, preferably at least 97 weight-%, based on the total weight of the dry matter of the feed additive without the weight of the absorbent.

TABLE 1

Composition of a solid feed additive according to the present invention, whereby the feed additive comprises an absorbent. All amounts are based on the total weight of said feed additive.

| Ingredient | Amount [weight-%] | preferred amount [weight-%] | more preferred amount [weight-%] | most preferred amount [weight-%] |
|---|---|---|---|---|
| Fat-soluble vitamin (compound a)) with the preferences as given above | 1-40 | 5-35 | 10-30 | 15-25 |
| lignosulfonate(s) (compound b)) with the preferences as given above | 5-55 | 5-50 | 5-45 | 10-40 |
| compound c) with the preferences as given above | ≥10 | 15-70 | 20-65 | 20-45 |
| Antioxidant (Compound d)) with the preferences as given above | 0.05-15 | 0.1-10 | 0.5-8 | 1-7 |
| Absorbent with the preferences as given below | 1-30 | 3-28 | 5-25 | 15-25 |
| Residual moisture | 0-10 | 0.5-8 | 1-5 | 3-5 |

Preferred Embodiments of the Feed Additives According to the Present Invention

Advantageously, the feed additives of the present invention do not comprise beeswax which is in discussion because of increasing levels of pesticide residues. Preferably, the feed additives do also not comprise any ingredient from animal origin such as e.g. gelatin.

The composition of preferred solid feed additives according to the present invention, which comprise an absorbent, are listed in the following Table 2. The total amounts of all ingredients are based on the total weight of the feed additive and sum up to 100 weight-%. It is understood that each single preferred amount of one ingredient may be combined with each preferred single amount of any other ingredient.

TABLE 2

| Ingredient | Amount [weight-%] | preferred amount [weight-%] | more preferred amount [weight-%] | most preferred amount [weight-%] |
|---|---|---|---|---|
| Fat-soluble vitamin (compound a)), preferably vitamin A or their derivatives such as Vitamin A acetate | 1-40 | 5-35 | 10-30 | 15-25 |
| lignosulfonate(s) (compound b)), preferably calcium lignosulfonate | 5-55 | 5-50 | 5-45 | 10-40 |
| OSA-starch + Yellow dextrin | ≥10 | 15-60 | 20-55 | 30-50 |
| Antioxidant (Compound d)), preferably α-tocopherol | 0.05-10 | 0.1-7 | 0.5-5 | 1-3 |
| Residual moisture and absorbent, preferably starch or silica | 1-30 | 3-28 | 5-28 | 10-25 |

Instead of dextrins, also glucose syrups or dried glucose syrups can be used together with modified OSA-starch.

Further preferred feed additives according to Table 2 are feed additives, wherein the total amount of the compounds a) to d) is at least 90 weight-%, preferably at least 95 weight-%, preferably at least 97 weight-%, based on the total weight of the feed additive excluding the absorbent.

If the feed additives are liquid, the amounts of their ingredients have to be adjusted accordingly to obtain feed additives with the same relative amounts of the feed additives (see also Tables 1 and 2). The amount of water in said liquid feed additives is preferably in the range of from 35 to 70 weight-%, more preferably in the range of from 40 to 65 weight-%, even more preferably in the range of from 45 to 60 weight-%, most preferably in the range of from 50 to 55 weight-%, based on the total weight of the liquid feed additive.

Processes of the Present Invention

The present invention is also directed to a process for the manufacture of a feed additive with all the preferences as cited above comprising the following steps:

i) Providing a matrix by dissolving the lignosulfonate and the compound c) and optionally a water-soluble antioxidant in water;

ii) Providing an active phase by dissolving the fat-soluble vitamin and optionally the fat-soluble antioxidant in an organic solvent;

iii) Mixing the matrix obtained in step i) and the active phase obtained in step ii) to obtain a dispersion;

iv) Comminuting the droplets of the active phase in the dispersion obtained in step iii) and removing the organic solvent to obtain a dispersion;

v) Drying said dispersion obtained in step iv) in presence of an absorbent to obtain the feed additive.

The feed additive may be used in liquid or in solid form. The liquid form is obtained after step iv), the solid form after step v). Preferably the feed additive of the present invention is used in solid form.

The single steps are disclosed in more detail below.

Step i)

The amounts of the lignosulfonate b), the compound c) and the water-soluble antioxidant d), if present, are chosen so that the final amounts of these compounds in the resulting dispersion or feed additive after having performed steps i) to iv) and i) to v), respectively, is as described above.

Preferably this step is performed at a temperature in the range of from 25 to 70° C., more preferably at a temperature in the range of from 30° C. to 65° C., even more preferably at a temperature in the range of from 40° C. to 62° C., most preferably at a temperature in the range of from 50° C. to 60° C.

Step ii)

The amounts of the fat-soluble vitamin a) and the fat-soluble antioxidant d), if present, are chosen so that the final amounts of these compounds in the resulting dispersion or feed additive after having performed steps i) to iv) and i) to v), respectively, is as described above.

Preferably the amount of the organic solvent and the dissolution temperature are chosen so as to dissolve the fat-soluble vitamin a) and the fat-soluble antioxidant d), if present, completely. Usually it is necessary to heat up the suspension obtained when mixing all compounds present in this step to get a solution.

Examples of suitable organic solvents are methanol, ethanol, n-propanol, iso-propanol, 1-methoxy-2-butanol, 1-propoxy-2-propanol, tetrahydrofuran, acetone, dichloromethane, chloroform, tetrachloromethane, dimethyl carbonate, diethyl carbonate, propylene carbonate, ethyl formate, methyl acetate, ethyl acetate, iso-propyl acetate and methyl tert-butyl ether.

The temperature to which the suspension is heated up is e.g. in the range of from 40 to 90° C., more preferably the temperature is in the range of from 50 to 80° C.

Step iii)

Preferably this step is performed at a mixing temperature in the range of from 30 to 70° C., more preferably at a mixing temperature in the range of 35 to 65° C., even more preferably at a mixing temperature in the range of 40° C. to 60° C. to obtain an emulsion.

Step iv)

The comminution can be achieved by using a rotor-stator device or a high-pressure homogenizer or both. Other devices known to the person skilled in the art may also be used.

If rotor-stator device and/or a high-pressure homogenizer is used, a pressure drop in the range of 70 to 1000 bar, more preferably in the range of 100 to 300 bar, is preferably applied.

The organic solvent may e.g. be removed by using a rotary evaporator or a thin film evaporator cascade. Other methods known to the person skilled in the art are also applicable.

Step v)

By the drying step the dispersion is converted into a solid form.

The conversion to the solid form can be achieved by any method known to the person skilled in the art where an absorbent is used, preferably by a powder-catch technique, whereby the sprayed dispersion droplets are caught by an absorbent (so-called "catch media"), such as starch, and dried.

Suitable absorbents include corn starch, as well as starches from other botanical sources, silica, modified silica, tricalcium phosphate, calcium carbonate, sodium carbonate, potassium carbonate, magnesium carbonate, calcium oxide, magnesium oxide, dicalcium diphosphate, calcium silicate, magnesium silicate, magnesium trisilicate, sodium aluminum silicate, talc, kaolin, calcium stearate, magnesium stearate, cellulose or mixtures thereof. Especially preferred are starch (i.e. corn starch as well as starches from other botanical sources), silica, tricalcium phosphate and hydrophobically modified silica, whereby corn starch or starches from other botanical sources such as waxy corn, wheat, tapioca, pea and potato are especially preferred.

In another embodiment of the present invention, the conversion to the solid form can be achieved by any method known to the person skilled in the art where no absorbent is used, e.g. by spray-drying, spray-drying in combination with fluidised bed granulation. The resulting feed additive does not comprise an absorbent; the amounts of the ingredients and their ranges are the same as given above, but based on the total weight of the feed additive without the weight of the absorbent.

Characteristics of the Feed Additives of the Present Invention

Preferably the inner phase of the feed additive according to the present invention, i.e. the inner phase of the liquid feed additive after step iv) or the inner phase of the solid feed additive after step v), when re-dispersed in deionized water, has a particle size in the range of from 100 to 300 nm, preferably in the range of from 120 to 250 nm, more preferably in the range of from 130 to 230 nm, measured via dynamic light scattering using especially the particle analyzer Delsa™ Nano S (Beckmann Coulter, New Castle, DE, USA); i.e. the particles have an average diameter according to normalized intensity distribution within the ranges as given above.

Dispersions According to the Present Invention

The present invention is also directed to the dispersion as obtained after having performed step iv) as well as to the following dispersion comprising:
at least a fat-soluble vitamin;
at least a lignosulfonate;
at least a compound selected from hexose-dimers, modified hexose-dimers, hexose-oligomers, modified hexose-oligomers, hexose-polymers, modified hexose-polymers, and any mixture thereof in an amount 10 weight-%;
at least an antioxidant in an amount in the range of from 0 to 15 weight-%;
wherein the amount of ethoxyquin in said dispersion is ≤0.5 weight-%; and
wherein the amount of butylated hydroxytoluene in said dispersion is ≤0.5 weight-%;
all amounts based on the total weight of the dry matter of said dispersion.

The amount of water in the dispersion is chosen in such a way so that its final amount in the dispersion is preferably in the range of from 40 to 65 weight-%, more preferably its final amount is in the range of from 45 to 60 weight-%, most preferably its final amount is in the range of from 50 to 55 weight-%, based on the total weight of the dispersion.

The amount of the fat-soluble vitamin in the dispersion is chosen in such a way so that its final amount in the dispersion is preferably in the range of from 1.0 to 40 weight-%, more preferably its final amount is in the range of from 5.0 to 35 weight-%, even more preferably its final amount is in the range of from 10 to 30 weight-%, most preferably its final amount is in the range of from 15 to 25 weight-%, based on the total weight of the dry matter of the dispersion.

The amount of the lignosulfonate is chosen in such a way so that its final amount in the dispersion is preferably in the range of from 5.0 to 55 weight-%, more preferably its final amount is in the range of from 5 to 50 weight-%, even more preferably its final amount is in the range of from 5 to 45 weight-%, most preferably its final amount is in the range of from 10 to 40 weight-%, based on the total weight of the dry matter of the dispersion.

The amount of the compound c) is chosen in such a way so that its final amount in the dispersion is preferably in the range of from 15 to 70 weight-%, more preferably its final amount is in the range of from 20 to 65 weight-%, most preferably its final amount is in the range of from 20 to 45 weight-%, based on the total weight of the dry matter of the dispersion.

The total amount of the antioxidant is chosen in such a way so that its final amount in the dispersion is preferably in the range of from 0.1 to 12 weight-%, more preferably its final amount is in the range of from 0.5 to 10 weight-%, most preferably its final amount is in the range of from 1 to 8 weight-%, based on the total weight of the dry matter of the dispersion.

The particle sizes of the dispersion are the same as given above for the solid/dried feed additive.

The preferences for the ingredients a) to c), the antioxidant and the absorbent also apply here.

The viscosity of the dispersion with a water content in the range of from 40-50 weight-%, measured at 50° C. with a Brookfield viscosimeter, is preferably in the range of from 80 to 140 cPs, more preferably in the range of from 90 to 135 cPs, even more preferably in the range of from 95 to 130 cPs, most preferably in the range of from 100 to 125 cPs.

Feed According to the Present Invention

The present invention is also directed to feed comprising the feed additive according to the present invention with the preferences as given above. Feed (or 'feedingstuff') means any substance or product, including additives, whether processed, partially processed or unprocessed, intended to be used for oral feeding to animals.

Feed in the context of the present invention is especially feed for broilers including starter, grower, finisher; broiler breeders including starter, grower (pullets), layers and male breeders, for layers and other poultry such as e.g. hens and duck layers, layers breeders, ducks and geese, partridges, quails and pheasants, ostrich and emu, for turkeys including starter, grower, finisher; for turkey breeders including starter, grower, layers and male breeders, for ruminants including calves, milk replacer, heifers, beef cattle, breeding bulls, sheep and goats; for horses, especially foals, leisure horses, race horses, mares and stallions, for rabbits, for mick and foxes, for swine including fattening pigs: pre-starter, starter, grower, finisher; breeders: replacement gilts, sows, boars, and feed for companion animals, especially for dogs and cats.

The amount of the feed additive and the fat-soluble vitamin respectively follows the regulatory guidelines in the regions depending on the specific animal species and its age.

In the Supplementation Guidelines the amount of the vitamins A and $D_3$ is given in International Units ("I.U.").

To ensure that the active content in the feed is communicated in a systematic way, "I.U." is used as a universal unit for fat soluble vitamins because there are different forms of the vitamins with varying amounts of fat-soluble vitamins.

The feed additive comprising the fat-soluble vitamin according to the present invention is usually added to feed in form of a premix, i.e. a mixture with other micro-nutrients such as other vitamins or their formulations and minerals. The premix inclusion in feed is <1 weight-% for many species.

Advantageously, feed additives according to the present invention comprising lignosulfonate(s), starch hydrolysates such as especially dextrins and modified food starch such as especially OSA starch show a brown color which makes them especially suitable for premixes which show the same color.

Advantageously, feed additives according to the present invention comprising lignosulfonate(s), starch hydrolysates such as especially dextrins, modified food starch such as especially OSA starch and native starch, preferably in a weight ratio of (1-3) to 1 to (2-6) to (1-3), show a yellow color which makes them especially suitable for milk replacements for calves which show the same color.

The amount of the feed additive comprising the fat-soluble vitamin needed to be included into the feed is calculated based on the active content of the feed and the targeted dosage of the fat-soluble vitamin in the final feed considering said inclusion level.

The conversion factors of the fat-soluble vitamins are as follows:

1 I.U. Vitamin A corresponds to 0.344 µg of Vitamin A acetate;
1 I.U. Vitamin $D_3$ corresponds to 0.025 µg of Vitamin $D_3$;
1 g of Vitamin $K_3$ (menadione) corresponds to 2.0 g of menadione sodium bisulfite ("MSB") and to 2.3 g of menadione nicotin-amide bisulfite ("MNB");
1 g of Vitamin E corresponds to 1.0 g of DL-α-tocopheryl acetate.

The following Table 3 shows the amounts of the fat-soluble vitamins added per kg of air-dry feed. The exact amount is depending on several factors such as phase/age of the animal, animal species and legal local limits.

TABLE I

European diet

| Ingredients (%) | Starter Period (day 0-21) | Grower Period (day 22-36) |
|---|---|---|
| Wheat | 20.00 | 22.50 |
| Rye | 12.00 | 12.00 |
| Soybean meal | 34.00 | 28.50 |
| Maize | 27.00 | 28.50 |
| Vegetable Oil | 3.10 | 4.20 |
| NaCl | 0.10 | 0.10 |
| DL Methionine | 0.24 | 0.24 |
| L-Lysine | 0.15 | 0.15 |
| Limestone | 0.85 | 0.85 |
| Dicalcium Phosphate | 1.50 | 1.90 |
| Vitamin & Mineral mix | 1.00 | 1.00 |
| Coccidiostat (Avatec) | 0.06 | 0.06 |
| $TiO_2$ | — | 0.10 |
| calculated Provision | | |
| apparent metabolizable energy, MJ/kg | 12.5 | 12.90 |
| apparent metabolizable energy, kcal/kg | 2986 | 3082 |
| crude Protein, % | 21.2 | 19.1 |
| Methionine + Cysteine, % | 0.89 | 0.83 |
| Lysine, % | 1.23 | 1.09 |
| Calcium, % | 0.83 | 0.91 |
| total phosphorus, % | 0.68 | 0.73 |
| available phosphorus, % | 0.35 | 0.40 |

TABLE II

Latin American diet

| Ingredients (%) | Starter | Grower |
|---|---|---|
| Corn | 53.0 | 57.1 |
| Soybean meal | 38.5 | 34.2 |
| Calcium | 0.70 | 0.70 |
| Phosphorus | 2.40 | 2.00 |
| $NaHCO_3$ | 0.23 | 0.24 |
| NaCl | 0.20 | 0.20 |
| Methionine | 0.30 | 0.10 |

TABLE 3

| Animal | Vitamin A [I.U.] | Vitamin $D_3$ [I.U.] | HyD [mg] | Vitamin E [mg] | Vitamin K3 (menadione) [mg] |
|---|---|---|---|---|---|
| Broilers | 10000-15000 | 3000-5000 | — | 50-200 | 3-7 |
| Turkeys | 6000-15000 | 3000-5000 | 0.092 | 30-200 | 2-5 |
| Layers & other poultry | 8000-16000 | 3000-5000 | 0.069 | 20-100 | 2-5 |
| Swine | 5000-20000 | 1000-2000 | 0.05 | 60-150 | 2-10 |
| Ruminants | 20000-150000 | 400-40000 | — | 100-4000 | 1-1.5 |
| Horses | 25000-80000 | 3500-8500 | — | 250-3300 | 6-12 |
| Rabbits | 8000-12000 | 800-1200 | — | 40-60 | 1-2 |
| Mink & Foxes | 10000-15000 | 1500-2000 | — | 100-200 | 1-2 |
| Dogs | 7100-23000 | 640-1100 | — | 50-500 | 1.7-2 |
| Cats | 9000-25000 | 750-1300 | — | 50-550 | 1-2 |
| Fish & Shrimps | 4000-12000 | 1500-6500 | — | 100-400 | 3-60 |

Below are given non-limiting examples of feed to which the feed additives of the present invention may be added.

Feed for Poultry

The feed for poultry differs from region to region. In the following Tables I and II typical examples for diets in Europe and Latin America are given. These diets include cereals such as wheat, rye, maize/corn, minerals such as NaCl, vegetable oils such as soya oil, amino acids and proteins.

TABLE II-continued

Latin American diet

| Ingredients (%) | Starter | Grower |
|---|---|---|
| Lysine | 0.21 | 0.00 |
| Soya Oil | 3.50 | 4.50 |
| Premix | 1.00 | 1.00 |

TABLE II-continued

Latin American diet

| Ingredients (%) | Starter | Grower |
| --- | --- | --- |
| Calculated provision (%) | | |
| Crude protein | 22.4 | 20.4 |
| apparent metabolizable energy, (MJ/kg) | 12.7 | 13.2 |
| apparent metabolizable energy, (kcal/kg) | 3034 | 3154 |
| Total phosphorus | 0.86 | 0.76 |
| Calcium | 1.00 | 0.85 |
| Available phosphorus | 0.44 | 0.38 |
| d-Lysine | 1.25 | 0.98 |
| d-Methionine + Cysteine | 0.91 | 0.68 |
| d-Threonine | 0.77 | 0.71 |
| Na | 0.18 | 0.18 |
| Cl | 0.20 | 0.19 |

Pet Food

Pet foods are formulated to meet nutrient specifications using combinations of multiple ingredients to meet the targeted nutrient specification.

Poultry meal e.g. is an ingredient that is commonly found in Dog and Cat foods.

The nutrient specifications for a complete and balanced dog or cat food will meet or exceed the guidelines provided by AAFCO (American Association of Feed Control Officials). The ingredient composition of pet-food can include any legal feed ingredient so number of combinations are not quite infinite but close. Some examples of ingredient used in dog and cat foods can be found in Table III below:

TABLE III

| Ingredient Class/Ingredient | Use rates |
| --- | --- |
| 1 ANIMAL MEALS | 10-35% |
| Chicken | |
| Turkey | |
| Duck | |
| Poultry Br-Product | |
| Lamb | |
| Venison | |
| Beef | |
| Pork | |
| Meat & Bone | |
| Fish | |
| 2 FRESH MEATS | 3-20% |
| Chicken | |
| Turkey | |
| Duck | |
| Lamb | |
| Venison | |
| Beef | |
| Pork | |
| Fish | |
| 3 VEGETABLE PROTEINS | 8-20% |
| Soybean Meal | |
| Corn Gluten Meal | |
| Pea Protein | |
| Potato Protein | |
| Soy Protein Conc/Isolates | |
| 4 GRAINS | 0-70% |
| Corn/Maize | |
| Wheat | |
| Brown Rice/Brewers Rice | |
| Oatmeal/Oat Groats | |
| Barley | |
| Millet | |
| Milo/Sorghum | |
| Rye | |
| Corn Gluten Feed | |
| Wheat Middlings | |

TABLE III-continued

| Ingredient Class/Ingredient | Use rates |
| --- | --- |
| 5 FIBER SOURCES | 2-8% |
| Beet Pulp | |
| Corn Bran | |
| Wheat Bran | |
| Cellulose | |
| Tomato Ponace | |
| Potato Fiber | |
| Pea Fiber | |
| 6 FATS & OILS | 1-15% |
| Animal Fat | |
| Poultry Fat | |
| Chicken Fat | |
| Beef Tallow | |
| Sunflower Oil | |
| Canola Oil | |
| 7 MICRONUTRIENTS | 0.10-1% |
| Vitamins | |
| Minerals | |
| Others (e.g. Fructooligosaccharides (FOS) used as a pre-biotic) | 0-5% |
| 8 PALATANTS (FLAVORS) | 0-5% |
| 9 Other non-basic ingredients | |
| Dried Egg Product | 1-15% |
| Fish Oil | 0.5-2% |
| Fish Meal | 1-4% |
| Flaxseed | 1-4% |
| Dried Peas | 5-30% |
| Dried Chickpeas | 5-30% |
| Dried Lentils | 5-10% |
| Dried Potatoes | 5-20% |
| Dried Sweet Potatoes | 5-20% |
| Tapioca Starch | 5-15% |
| Potato Starch | 5-15% |
| Pea Starch | 5-15% |

Feed for Swine

Reference is made here to the NATIONAL SWINE NUTRITION GUIDE, 2010, whereby two non-limiting examples are given below.

TABLE IV

Corn and Soybean Meal Diet

| DIET | PERCENTAGE, % |
| --- | --- |
| Corn, yellow | 70.99 |
| Soybean meal, solv. extr., CF < 4%, CP < 48% | 25.19 |
| Corn oil | 1.00 |
| Calcium carbonate | 0.95 |
| Monocalcium phosphate | 0.78 |
| Salt (NaCl) | 0.37 |
| L-Lysine HCl | 0.17 |
| DL-Methionine | 0.04 |
| L-Threonine | 0.02 |
| Vitamin and trace mineral premix | 0.50 |
| Total | 100% |

TABLE V

High fiber ingredient diet

| DIET | PERCENTAGE, % |
| --- | --- |
| Corn, yellow | 37.48 |
| Corn DDGS, <4% oil | 30.00 |
| Wheat middlings | 19.00 |
| Soybean meal, solv. extr., CF < 4%, CP < 48% | 7.11 |

TABLE V-continued

High fiber ingredient diet

| DIET | PERCENTAGE, % |
|---|---|
| Corn oil | 3.52 |
| Calcium carbonate | 1.28 |
| Salt (NaCl) | 0.39 |
| L-Lysine HCl | 0.57 |
| DL-Methionine | 0.03 |
| L-Tryptophan | 0.04 |
| L-Threonine | 0.10 |
| Vitamin and trace mineral premix | 0.50 |
| Total | 100% |

Further Embodiments According to the Present Invention

The present invention is also directed to the use of the feed additive according to the present invention with the preferences as given above for supplementing fat-soluble vitamin(s) to an animal, especially those cited above, excluding humans, as well as to the use of feed according to the present invention with the preferences as given above for supplementing fat-soluble vitamin(s) to an animal, especially those cited above, excluding humans.

Further embodiments of the present invention are methods of supplementing fat-soluble vitamin(s) to an animal excluding humans by administering a feed additive according to the present invention with the preferences as given above or a feed according to the present invention with the preferences as given above to said animal.

Hereby the supplementation of vitamin A acetate or vitamin D3 or both is especially preferred.

The invention is now further illustrated in the following non-limiting examples.

EXAMPLES

Examples 1-4: Preparation of the Feed Additive According to the Present Invention Comprising Vitamin a Acetate The used ingredients and their amounts are given in Table 4, the characteristics of the feed additives in Table 5.

As compound c) a mixture of an OSA starch and dextrin yellow is used, whereby additionally native starch may be present.

As compound b) calcium lignosulfonate (as commercially available from Borregaard LignoTech, Norway) is used, as a fat-soluble antioxidant dl-α-tocopherol and as a water-soluble antioxidant sodium ascorbate.

Compounds b), c) and the water-soluble antioxidant are dissolved in deionized water to obtain the so-called "matrix".

The crystalline vitamin A acetate and the fat-soluble antioxidant are heated at 65° C. under stirring in a water bath until the complete melting of the crystals to obtain the so-called "active phase".

Subsequently, the active phase is pre-emulsified into the matrix at 5500 rpm by using a rotor-stator homogenizer. Afterwards, the emulsion is further emulsified at 6000 rmp for 30 minutes.

Subsequently, the emulsion is sprayed into the catch medium (fluidized starch or silica). The solid formulation remains in the catch medium for 45-60 minutes to obtain beadlets. After drying the dried beadlets are sieved and the fraction with a particle size in the range of 160 to 630 μm is used for the further tests (stability, process loss etc.).

TABLE 4

| | Example 1 | Example 2 | Example 3 | Example 4 |
|---|---|---|---|---|
| Vitamin A acetate [weight-%] | 18.5 | 20.9 | 20.9 | 17.5 |
| Lignosulfonate [weight-%] | 31.5 | 34.1 | 34.1 | 12.8 |
| Modified food starch [weight-%] | 15.0 | 17.7 | 17.7 | 35.3 |
| Dextrin yellow [weight-%] | 7.0 | 17.9 | 17.9 | 7.7 |
| Native corn starch [weight-%] | — | — | — | 12.8 |
| Fat-soluble antioxidant [weight-%] | 3.0 | 1.4 | 1.4 | 2.5 |
| water-soluble antioxidant [weight-%] | 3.0 | 1.0 | — | — |
| Catch medium | 22.0 (fluidized starch) | 7.0 (silica) | 7.0 (silica) | 22.0 (fluidized starch) |

Vitamin a Acetate Stability During Stress Testing Exposing Prototypes to 40° C. and 75% Relative Humidity (Feed Additives According to Examples 1-4)

Aliquots of 120 mg are weighed into perforated capped plastic tubes. Thus, the samples are exposed to the environment during storage for 4 and 8 weeks in climatized rooms at 40° C. and 75% relative humidity. The total vitamin A acetate concentration is determined by HPLC (high performance liquid chromatography) at the respective storage time. In brief, the aforementioned aliquot of 120 mg is transferred to a flask containing 200 mg BHT (butylated hydroxytyrosol). BHT prevents further degradation of the vitamin A acetate during the analytical procedure. Subsequently, the sample is re-dispersed in 10 mL deionized water at 50° C. After adding 100 mL ethanol and 80 ml dichloromethane, the mixture is kept for 30 min at room temperature. Afterwards, the sample is made up to 200 mL with dichloromethane and an aliquot of 10 mL is centrifuged for 5 min at 4000 rpm. The supernatant of the centrifuged stock solution is filled into amber glass vials for HPLC analysis. Vitamin A retentions are calculated based on the initial concentration. Each test is performed two times. The average of the results is shown in Table 5. The accuracy is ±5%. The starting value is 100%. The results show that the feed additive of vitamin A acetate is stable under both conditions for at least 2 weeks.

Process Loss

To measure the vitamin A acetate process losses of solid particles the following procedure is followed:

100 mg dry beadlets are transferred in a 200 mL volumetric flask.

5 mL of 2 wt % ammonia solution (Merck Group, Germany) and 50 mg of amylase (Merck Group, Germany) are added in the flask.

The flask is added in an ultrasound water bath for 10 min, set at 70° C.

Afterwards, the flask is cooled down to room temperature

Ethanol is added until the meniscus of the volumetric flask and then the flask is shaked smoothly, until a homogenous dispersion is obtained. 2 mL of the dispersion are then collected and injected in the HPLC.

Process losses vit $A =$ $$\frac{\text{Vitamin } A \text{ that is left after the formulation process}}{\text{total vitamin } A \text{ added in formulation}} \times 100.$$

Color Measurements

Color measurements are performed with a colorimeter (Hunter Lab Ultra Scan Pro) which can other than a spectrophotometer express color values according to the psychophysical perception of color by human eye.

Color measurements are carried out after CIE guidelines (Commission International d'Eclairage). Values can be expressed either as planar coordinates L*a*b* with L* being the measuring value for lightness, with a* being the value on the red-green-axis and with b* being the value on the yellow-blue-axis.

Instrument Settings:
Color scale: CIE L*a*b*/L*C*h*
Light source definition: D65 daylight equivalent
Geometry: Diffuse/10°
Wavelengths: scan 400 to 800 nm
Sample measurement area diameter: 19.812 mm (large)
Calibration mode: Reflection including shining.

TABLE 5

| Feed additive according to | Vitamin A acetate retention [%] after 2 weeks of stress test (40° C./75% relative humidity) | Process loss [%] | Color values |
|---|---|---|---|
| Example 1 | not determined | not determined | L, a, b not determined; appearance: brown |
| Example 2 | 91.8 | 3.7 | L, a, b not determined; appearance: brown |
| Example 3 | 93.6 | 1.0 | L = 66.64<br>a = 5.29<br>b = 23.83<br>appearance: brown |
| Example 4 | 89.3 | 1.0 | L = 88.53<br>a = −3.88<br>b = 41.03<br>appearance: yellow |

The invention claimed is:

1. A feed additive comprising, based on total weight of the feed additive, the following components:
(a) at least one fat-soluble vitamin in an amount from 1 to 40 weight-%;
(b) at least one lignosulfonate selected from the group consisting of sodium lignosulfonate, calcium lignosulfonate and mixtures thereof in an amount from 5 to 55 weight-%; and
(c) a mixture of OSA-starch and dextrin having a dextrose equivalent of between 3 to 20 in an amount of 15 to 70 weight-%; wherein
the mixture of component (c) and the at least one lignosulfonate of component (b) are present in a weight ratio of the component (c) to the component (b) of 1:15 to 25:1, and wherein
the at least one lignosulfonate of component (b) and the mixture of component (c) form a matrix in which the at least one fat-soluble vitamin of component (a) is encapsulated; and wherein
the feed additive is essentially free of ethoxyquin and butylated hydroxytoluene such that the amount of each of ethoxyquin and butylated hydroxytoluene in the feed additive is ≤0.5 weight-%.

2. The feed additive according to claim 1, wherein the at least one fat-soluble vitamin of component (a) is selected from the group consisting of vitamin A, vitamin D and derivatives or mixtures thereof.

3. The feed additive according to claim 1, which further comprises an antioxidant.

4. The feed additive according to claim 1, which further comprises an absorbent.

5. The feed additive according to claim 1, wherein the feed additive comprises:
(a) 5 to 35 weight-% of the at least one fat-soluble vitamin;
(b) 5 to 50 weight-% of the at least one lignosulfonate;
(c) 15 to 70 weight-% of the mixture of OSA-starch and dextrin;
(d) 0.05 to 15 weight-% of an antioxidant;
(e) 1 to 30 weight-% of an absorbent; and
(f) residual moisture in an amount from 0 to 10 weight-%.

6. A method for manufacturing the feed additive according to claim 1, the method comprising the steps of:
(i) providing a matrix by dissolving the at least one lignosulfonate of component (b) and the mixture of component (c), and optionally a water-soluble antioxidant in water;
(ii) providing an active phase by dissolving the at least one fat-soluble vitamin of component (a) and optionally a fat-soluble antioxidant in an organic solvent;
(iii) mixing the matrix obtained in step (i) and the active phase obtained in step (ii) to obtain an initial dispersion of droplets of the active phase in the matrix;
(iv) comminuting the droplets of the active phase in the initial dispersion obtained in step (iii) and removing the organic solvent to obtain a final dispersion;
(v) drying the final dispersion obtained in step (iv) in presence of an absorbent to obtain the feed additive.

7. Feed comprising the feed additive according to claim 1.

8. A method of supplementing at least one fat-soluble vitamin to an animal excluding humans by administering to the animal the feed additive according to claim 1.

* * * * *